(12) United States Patent
Boehm et al.

(10) Patent No.: US 7,005,622 B2
(45) Date of Patent: Feb. 28, 2006

(54) MICROSCOPE SYSTEM HAVING A SCANNING DEVICE WITH FIRST AND SECOND PARTIAL IMAGES

(75) Inventors: Ingo Boehm, Heidelberg (DE); Frank Schreiber, Dossenheim (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 0 days.

(21) Appl. No.: 10/770,718

(22) Filed: Feb. 3, 2004

(65) Prior Publication Data

US 2004/0156102 A1 Aug. 12, 2004

Related U.S. Application Data

(62) Division of application No. 10/287,296, filed on Nov. 4, 2002, now Pat. No. 6,717,726.

(30) Foreign Application Priority Data

Nov. 16, 2001 (DE) ................. 101 56 506

(51) Int. Cl.
*G02B 7/04* (2006.01)
(52) U.S. Cl. ................. 250/201.3; 250/201.2
(58) Field of Classification Search ............. 250/201.3, 250/201.2, 201.8, 208.1, 306, 307; 356/450, 356/370; 359/368, 370
See application file for complete search history.

(56) References Cited

U.S. PATENT DOCUMENTS 6,353,216 B1 * 3/2002 Oren et al. ............... 250/201.3
6,445,453 B1 * 9/2002 Hill ........................... 356/450

\* cited by examiner

*Primary Examiner*—Que T. Le
(74) *Attorney, Agent, or Firm*—Davidson, Davidson & Kappel, LLC

(57) ABSTRACT

A method for generating a multicolor image of a specimen with a microscope is disclosed. The method comprises the step of determining the spacing of the focal planes of a first illuminating light beam that has a first wavelength and of a second illuminating light beam that has a second wavelength; the step of scanning the specimen with the first illuminating light beam and generating a first partial image; the step of performing a relative displacement, by an amount equal to the spacing, between the specimen and the focal plane of the illuminating light beam of the second wavelength; the step of scanning the specimen with the second illuminating light beam and generating a second partial image; and the step of superimposing the first and second partial images to yield the multicolor image. Further more a microscope and a confocal scanning microscope are disclosed.

16 Claims, 3 Drawing Sheets

MICROSCOPE SYSTEM HAVING A SCANNING DEVICE WITH FIRST AND SECOND PARTIAL IMAGES

CROSS REFERENCE TO RELATED APPLICATIONS

This application is a division of prior application Ser. No. 10/287,296, filed Nov. 4, 2002, now U.S. Pat. No. 6,717,726, which claims priority to German patent application no. 101 56 506.2. Both of these applications are hereby incorporated by reference herein.

FIELD OF THE INVENTION

The invention concerns a method for generating a multicolor image of a specimen with a microscope.

The invention further concerns a microscope and a confocal scanning microscope.

BACKGROUND OF THE INVENTION

In scanning microscopy, a specimen is illuminated with a light beam in order to observe the reflected or fluorescent light emitted by the specimen. The focus of an illuminating light beam is moved in a specimen plane by means of a controllable beam deflection device, generally by tilting two mirrors; the deflection axes are usually perpendicular to one another, so that one mirror deflects in the X direction and the other in the Y direction. Tilting of the mirrors is brought about, for example, by means of galvanometer positioning elements. The power level of the light coming from the specimen is measured as a function of the position of the scanning beam. The positioning elements are usually equipped with sensors to ascertain the present mirror position.

In confocal scanning microscopy specifically, a specimen is scanned in three dimensions with the focus of a light beam.

A confocal scanning microscope generally comprises a light source, a focusing optical system with which the light of the source is focused onto an aperture (called the "excitation pinhole"), a beam splitter, a beam deflection device for beam control, a microscope optical system, a detection pinhole, and the detectors for detecting the detected or fluorescent light. The illuminating light is coupled in via a beam splitter. The fluorescent or reflected light coming from the specimen travels through the beam deflection device back to the beam splitter, passes through it, and is then focused onto the detection pinhole behind which the detectors are located. Detected light that does not derive directly from the focus region takes a different light path and does not pass through the detection pinhole, so that a point datum is obtained which results, by sequential scanning of the specimen, in a three-dimensional image. A three-dimensional image is usually achieved by acquiring image data in layers, the track of the scanning light beam on or in the specimen ideally describing a meander (scanning one line in the X direction at a constant Y position, then stopping the X scan and slewing by Y displacement to the next line to be scanned, then scanning that line in the negative X direction at constant Y position, etc.).

For the examination of biological specimens, it is been usual for some time to prepare the specimen with optical markers, in particular with fluorescent dyes. Often, for example in the field of genetic investigations, several different fluorescent dyes are introduced into the specimen and become attached specifically to certain specimen constituents. From the fluorescence properties of the prepared specimen it is possible, for example, to draw conclusions as to the nature and composition of the specimen or the concentrations of particular substances within the specimen. In most cases, multiple lasers are used for simultaneous illumination with light of several wavelengths. EP 0 495 930, "Confocal microscope system for multicolor fluorescence," discloses an arrangement having a single laser that emits several laser lines. In practice, mixed-gas lasers, in particular ArKr lasers, are generally used for this purpose. For detection, several detectors for detected light of different wavelengths are generally provided. One particularly flexible arrangement for simultaneous multicolor detection of detected light of several wavelengths is disclosed in German Patent DE 199 02 625, "Apparatus for simultaneous detection of several spectral regions of a laser beam."

In addition to simultaneous multicolor detection, sequential detection of image data at different wavelengths also plays an important role in microscopy. Here the image data for the images at the different detected light wavelengths are obtained sequentially in time. The images can be displayed to the user in the form of several individual depictions, each individual depiction being associated with one detected light wavelength or one detected light wavelength region. Display of a superimposed depiction of the individual depictions is also usual; it is very important in this context that the image data of the individual depictions belonging to the same points in the specimen be precisely interassociated.

In the context of multicolor detection, the known microscopes have the disadvantage, because of chromatic aberrations of the optical system and especially because of longitudinal chromatic aberration, that at the different detection wavelengths, image data are unintentionally obtained from different specimen regions, e.g. from specimen section planes of different depths. This results in depictions or images that are not comparable, and is particularly disadvantageously evident in the superimposed depiction.

A scanning microscope that partly eliminates the aforementioned disadvantages is disclosed in German Unexamined Application DE 100 18 256 A1. The scanning microscope is characterized in that the optical properties in particular of the components arranged in the beam path are coordinated with one another in such a way that the cumulative aberrations are at least on the order of the theoretically achievable resolution with respect to the optical axis and/or at least one surface in the specimen region. This approach requires very complex and very expensive optics, and cannot be implemented simultaneously for the entire possible detection spectrum.

SUMMARY OF THE INVENTION

It is therefore an object of the present invention to provide a method for generating a multicolor image of a specimen with a microscope that allows easy generation of comparable and spatially largely superimposable depictions, each at a different detection wavelength, of a specimen or regions of a specimen.

The present invention provides a method characterized by the following steps:
  determining a spacing of focal planes of a first illuminating light beam that has a first wavelength and of a second illuminating light beam that has a second wavelength;
  scanning the specimen with the first illuminating light beam and generating a first partial image;

performing a relative displacement, by an amount equal to the spacing, between the specimen and the focal plane of the illuminating light beam of the second wavelength;

scanning the specimen with the second illuminating light beam and generating a second partial image; and superimposing the first and second partial images to yield the multicolor image.

It is also an object of the present invention to provide a microscope that allows easy generation of comparable and spatially largely superimposable depictions, each at a different detection wavelength, of a specimen or regions of a specimen.

The present invention also provides a microscope having a light source that emits at least a first illuminating light beam that has a first wavelength and a second illuminating light beam that has a second wavelength, and having an optical system for focusing the illuminating light beams onto a specimen, the first illuminating light beam defining a first focal plane and the second illuminating light beam defining a second focal plane, wherein the spacing of the focal planes can be determined; and a means is provided for performing a relative displacement, by an amount equal to the spacing, between the specimen and the focal plane defined by the second illuminating light beam.

In a preferred embodiment, the relative displacement is performed with a displaceable objective. For that purpose, the microscope according to the present invention is preferably equipped with an objective turret displacement device such as is known from German Unexamined Application DE 199 24 709. In another variant embodiment, the relative displacement is performed with a zoom optical system. The relative displacement can also encompass displacement of the specimen, for example with a special precisely movable specimen stage.

The partial images can be one-dimensional, two-dimensional, or three-dimensional partial images.

Preferably a reference measurement is carried out in order to determine the spacing; this is best done before data acquisition begins. This procedure is particularly accurate because it incorporates all the optical elements of the microscope into the determination. This type of determination is moreover independent of the quality of the objective and also particularly flexible, since one determination for all excitation and detection wavelengths is possible. It is very particularly advantageous to effect the determination of the spacing of the focal planes with the aid of profile sections, i.e. from X-Z sections or X-Y sections, at different excitation and detection wavelengths. In a preferred embodiment, determination of the spacing is accomplished automatically.

In another embodiment, the determination of the spacing of the focal planes for various boundary conditions is performed by the manufacturer. The spacings that are determined are stored in a memory and can be retrieved by the user.

In a preferred embodiment, the microscope is a scanning microscope or a confocal scanning microscope.

A microscope according to the present invention preferably contains an apparatus for superimposition of a first partial image generated with the first illuminating light beam and a second partial image generated with the second illuminating light beam. This apparatus can be configured as a special electronic logic unit or PC.

The spacing of the focal planes can preferably be determined automatically. For that purpose, profile sections, i.e. X-Z sections or X-Y sections, are automatically produced at various excitation and detection wavelengths and analyzed using image processing software. The spatial position of the first and/or the second focal plane can be stored in a memory module and retrieved for data acquisition or in the context of later image processing.

In a preferred embodiment, the microscope is a scanning microscope or a confocal scanning microscope.

BRIEF DESCRIPTION OF THE DRAWINGS

The subject matter of the invention is depicted schematically in the drawings and will be described below with reference to the Figures, in which.

DETAILED DESCRIPTION OF THE INVENTION

Figure 1:
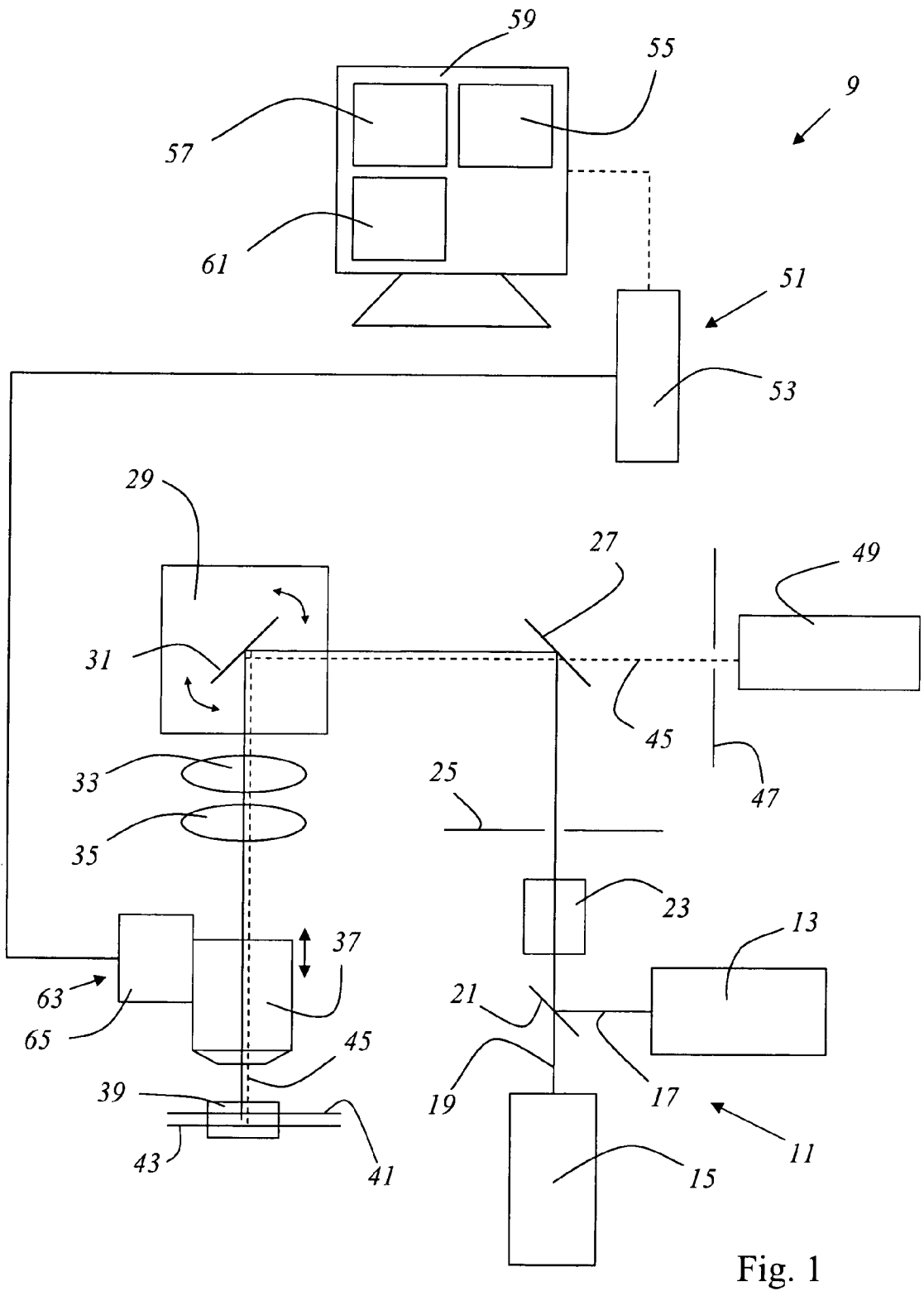
FIG. 1 shows a microscope according to the present invention.

FIG. 1 schematically shows a microscope 9 that is configured as a confocal scanning microscope. Microscope 9 comprises as light source 11 a first laser 13 that emits a first illuminating light beam 17 which has a first wavelength, and a second laser 15 that emits a second illuminating light beam 19 which has a second wavelength. First and second illuminating light beams 17, 19 are combined using a dichroic beam combiner 21. The power levels of first and second illuminating light beams 17, 19 can be adjusted, individually and independently of one another, with an acoustooptical filter 23 (AOTF). After passing through an excitation pinhole 25, illuminating light beams 17, 19 are reflected by a beam splitter 27 to scanning module 29, which contains a gimbal-mounted scanning mirror 31 that guides the beam through a scanning optical system 33, a tube optical system 35, and a microscope optical system 37 over or through a specimen 39. In the case of non-transparent specimens 39, illuminating light beams 17, 19 are guided over the specimen surface. With biological specimens 39 (preparations) or transparent specimens 39, illuminating light beams 17, 19 can be guided through specimen 39. This means that different focal planes of specimen 39 are successively scanned by illuminating light beams 17, 19. Subsequent assembly then yields a three-dimensional image of specimen 39. Illuminating light beams 17, 19 coming from light source 11 are depicted in the Figure as solid lines. Microscope optical system 37 focuses illuminating light beams 17, 19 onto specimen 39, first illuminating light beam 17 defining a first focal plane 41 and second light beam 19 a second focal plane 43, which have a spacing from one another. Detected light 45 proceeding from specimen 39 travels through microscope optical system 37, tube optical system 35, and scanning optical system 33 and via scanning module 29 to beam splitter 27, passes through the latter and, after passing through detection pinhole 47, strikes a detector 49 which is embodied as a photomultiplier. Detected light 45 proceeding from specimen 39 is depicted in the Figure as a dashed line. In detector 49, electrical detected signals proportional to the power level of detected light 45 proceeding from specimen 39 are generated and forwarded to processing unit 51, which is embodied as PC 53. In processing unit 51, the detected signals are assembled into a first image 55 and a second image 57 of specimen 39. First image 55 results from scanning specimen 39 exclusively with first illuminating light beam 17, which excites a first fluorochrome of specimen 39. Second image 57 results from scanning specimen 39 exclusively with second illuminating light beam 19, which excites a second fluorochrome of specimen 39 that has an emission spectrum different from that of the first fluorochrome. Images 57, 59 are displayed on a display 59. Also displayed on display 59 is superimposed image 61 which PC 53 calculates from first image 55 and second image 57. Between the scanning of specimen 39 with first illuminating light beam 17 and the scanning of the specimen with second illuminating light beam 19, the microscope optical system was displaced by an amount equal to the previously determined spacing of focal planes 41, 43. A means 63 for performing a relative displacement, which is embodied as piezodisplacement device 65 that is controlled by PC 53, is provided for displacement. The spacing of the focal planes is determined automatically by PC 53 by acquiring and analyzing profile sections that were respectively acquired with first illuminating light beam 17 and second illuminating light beam 19.

Figure 2:
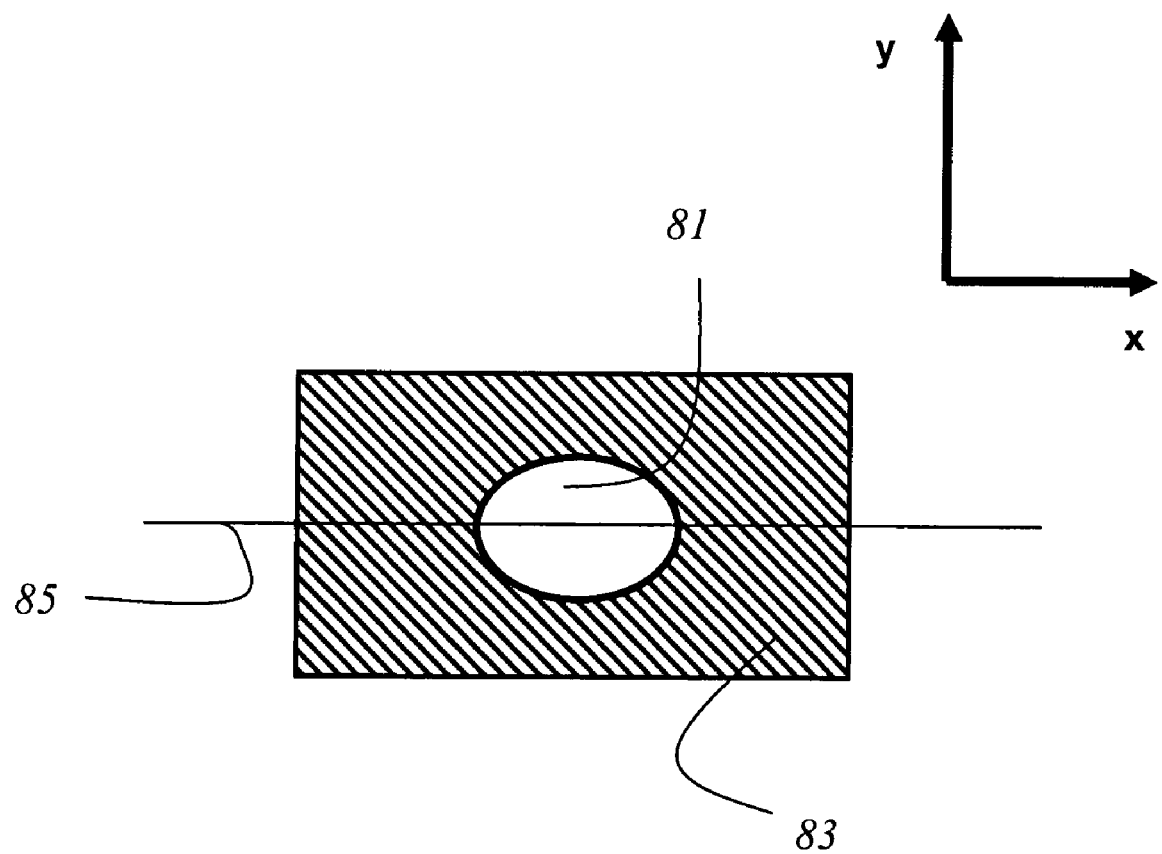
FIG. 2 shows the image of a X-Y section of a biological specimen.

FIG. 2 shows an X-Y section of a biological specimen 39 that is labeled with two different fluorescent dyes. Cell nucleus 81 is labeled with a first fluorescent dye that can be excited at a wavelength of 364 nm of a first illuminating light beam. Cell body 83 is labeled with a second fluorescent dye that can be excited at a wavelength of 488 nm of a second illuminating light beam. Profile section (X-Y section) 85 is explained in more detail in FIGS. 3 and 4.

Figure 3:
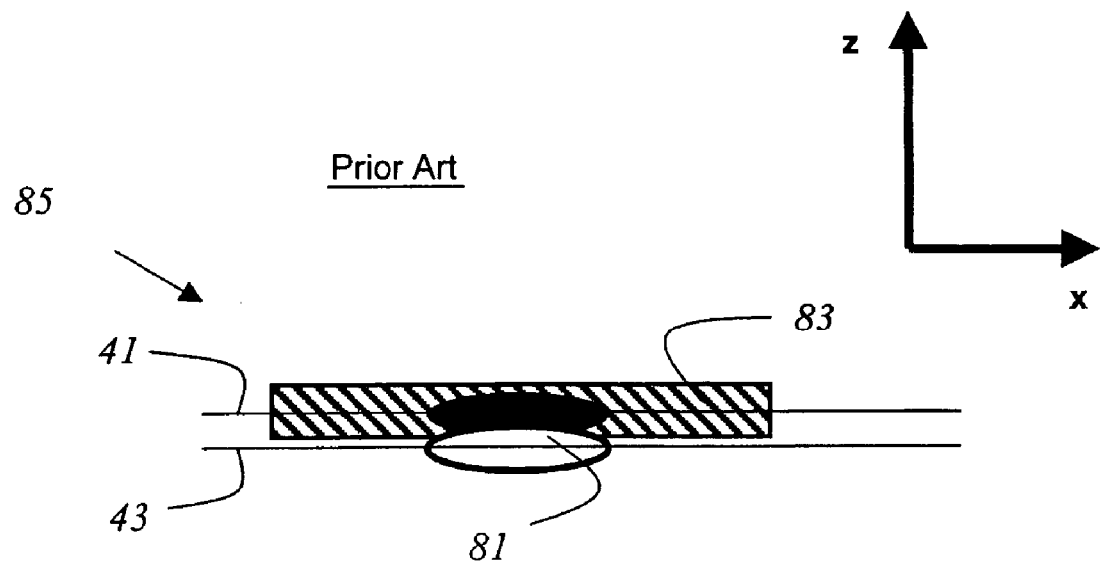
FIG. 3 shows the image of an X-Z section through a specimen according to the existing art.

FIG. 3 shows the image of a profile section 85, namely an X-Z section, through the biological specimen already shown in FIG. 2 according to the existing art. The illuminating light beams focused onto the specimen define two focal planes 41, 43 that have a spacing from one another: the first illuminating light beam defines a first focal plane 41, and the second illuminating light beam a second focal plane 43. Because of the spacing of focal planes 41, 43, a serious aberration occurs in the image of the X-Z section in which the image data that were obtained upon illumination with the first illuminating light beam were superimposed on the image data obtained upon illumination with the second illuminating light beam. In the image, the location of cell nucleus 81 within cell body 83 does not correspond to the actual situation.

Figure 4:
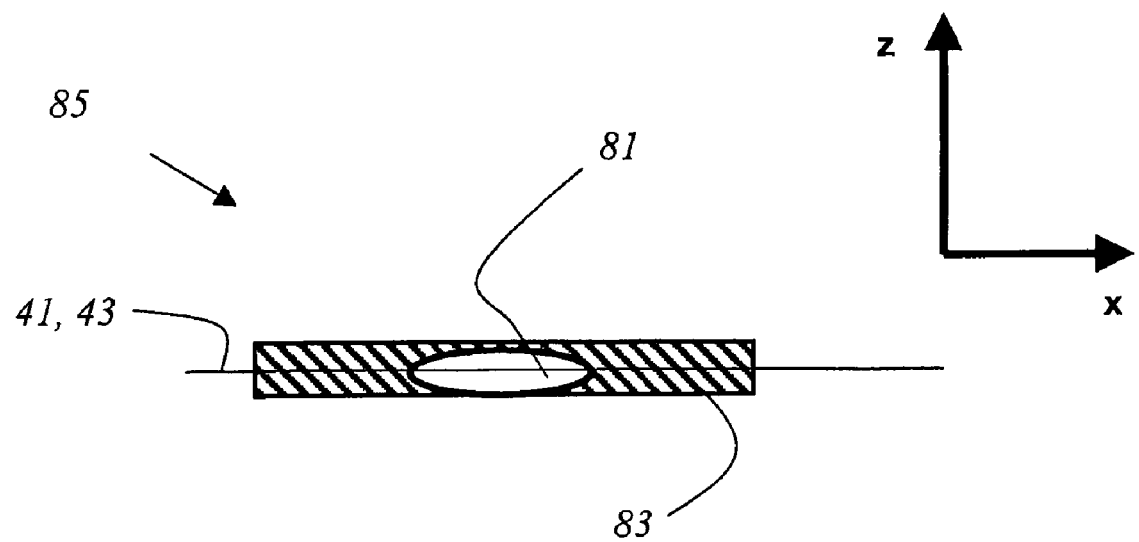
FIG. 4 shows the image of an X-Z section through a specimen.

FIG. 4 shows the image of a profile section 85, namely an X-Z section, through the biological specimen already shown in FIG. 2 as yielded by the method according to the present invention. In the image, the location of cell nucleus 81 within cell body 83 does not correspond to the real actual situation.

The invention has been described with reference to a particular exemplary embodiment. It is nevertheless self-evident that changes and modifications can be made without thereby leaving the range of protection of the claims below.

What is claimed is:

1. A microscope comprising:
   a light source that emits at least a first illuminating light beam that has a first wavelength and a second illuminating light beam that has a second wavelength
   an optical system for focusing the illuminating light beams onto a specimen, the first illuminating light beam defining a first focal plane and the second illuminating light beam defining a second focal plane, the focal planes having a spacing from each other;
   a displacement device for performing a relative displacement, by an amount equal to the spacing, between the specimen and the focal plane defined by the second illuminating light beam; and
   a scanning device for scanning the specimen with the first illuminating light beam in the first focal plane so as to provide a first partial image and for scanning the specimen with the second illuminating light beam in the second focal plane so as to provide a second partial image.

2. The microscope as defined in claim 1, further comprising an apparatus for superimposition of a first partial image generated with the first illuminating light beam and a second partial image generated with the second illuminating light beam.

3. The microscope as defined in claim 2, wherein the apparatus for superimposition is a PC.

4. The microscope as defined in claim 1, further comprising a spacing determination device for determining the spacing automatically.

5. The microscope as defined in claim 1, wherein the first and/or second partial images are three-dimensional partial images.

6. The microscope as defined in claim 1, wherein the first and/or second partial images are two-dimensional partial images.

7. The microscope as defined in claim 1, further comprising a storage device for storing a position of the first and/or the second focal plane.

8. A confocal scanning microscope comprising:
   a light source that emits at least a first illuminating light beam that has a first wavelength and a second illuminating light beam that has a second wavelength;
   an optical system for focusing the illuminating light beams onto a specimen, the first illuminating light beam defining a first focal plane and the second illuminating light beam defining a second focal plane, the focal planes having a spacing from each other;
   a displacement device for performing a relative displacement, by an amount equal to the spacing, between the specimen and the focal plane defined by the second illuminating light beam; and
   a scanning device for scanning the specimen with the first illuminating light beam in the first focal plane so as to provide a first partial image and for scanning the specimen with the second illuminating light beam in the second focal plane so as to provide a second partial image.

9. The microscope as defined in claim 8, further comprising an apparatus for superimposition of a first partial image generated with the first illuminating light beam and a second partial image generated with the second illuminating light beam.

10. The microscope as defined in claim 9, wherein the apparatus for superimposition is a PC.

11. The microscope as defined in claim 8 further comprising a spacing determination device for determining the spacing automatically.

12. The microscope as defined in claim 8, wherein the first and/or second partial images are three-dimensional partial images.

13. The microscope as defined in claim 8, wherein the first and/or second partial images are two-dimensional partial images.

14. The microscope as defined in claim 8, further comprising a storage device for storing a position of the first and/or the second focal plane.

15. The microscope as defined in claim 8, wherein the displacement device is configured to perform the relative displacement in a time between the scanning the specimen with the first illuminating light beam in the first focal plane and the scanning the specimen with the second illuminating light beam in the second focal plane.

16. The microscope as defined in claim 1, wherein the displacement device is configured to perform the relative displacement in a time between the scanning the specimen with the first illuminating light beam in the first focal plane and the scanning the specimen with the second illuminating light beam in the second focal plane.

* * * * *